United States Patent Office 3,475,268
Patented Oct. 28, 1969

3,475,268
CELLULOSIC METALLIC LAMINATES
Vytautas E. Bildusas, Chicago, Ill., assignor to Swift & Company, Chicago, Ill., a corporation of Illinois
No Drawing. Original application Oct. 24, 1962, Ser. No. 232,885, now Patent No. 3,375,121, dated Mar. 26, 1968. Divided and this application Dec. 11, 1967, Ser. No. 689,270
The portion of the term of the patent subsequent to Mar. 26, 1985, has been disclaimed
Int. Cl. B32b 15/12, 15/10
U.S. Cl. 161—214
10 Claims

ABSTRACT OF THE DISCLOSURE

Adhesive compositions comprising casein, a metallic oxide, diammonium phosphate with or without natural and synthetic polymeric materials. Laminates represented by cellulosic-metallic laminates with adhesive interposed between the layers are disclosed.

---

This application is a division of my copending U.S. application Ser. No. 232,885 filed Oct. 24, 1962 now Patent Number 3,375,121.

This invention relates to the manufacture of an adhesive and to processes for the production of said adhesive. The resulting adhesive is particularly valuable for the production of cellulosic and foil combinations for the wrapping of food products, and making of bottle labels, etc.

Casein adhesives have been used satisfactorily for the gluing of wood and as a base for preparing coating compounds of paper. However, casein shows very little adhesive properties when applied to metals or when used as an adhesive between cellulosic materials such as cloth or paper and metal such as tin or aluminum foil. Casein solutions containing fluorine compounds have been used to bond cellulosics to metal, but films cast from such solutions are quite sensitive to water. Furthermore, casein solutions containing ammonium, zinc or magnesium silicofluorides, as well as alkali metal fluorides and alkali metal and ammonium fluoborates, are to a certain extent toxic.

Generally, casein solutions are prepared by dissolving the casein with an alkali such as monovalent metal oxides or hydroxides, but such solutions do not maintain a stable viscosity upon aging. Multivalent metal salts form water insoluble caseinates which consequently gel upon aging. Even the peptizing agents, for example, urea, do not produce casein solutions of stable viscosity as such solutions either thin out or body up on storage, depending on the concentration of the peptizer and the heat treatment used in their preparation. Sodium naphthalene sulfonate has been used to produce viscosity-stable casein solutions, but dry films of this adhesive are soluble in cold water. In addition, phosphates have been used in casein solutions, but such solutions also have unstable viscosity.

Accordingly, it is an object of this invention to produce casein adhesive films of which when air-dried are water-resistant.

It is also an object of this invention to produce an adhesive which has viscosity stability and is nontoxic.

A further object of this invention is to manufacture an adhesive base which is compatible with both the low and high pH resin latices.

A still further object is to provide a process for producing an adhesive which has the above-mentioned properties.

Additional objects of this invention include the production of laminates and especially laminates of cellulosic materials with metal foil.

Additional objects, if not specifically set forth herein, will be readily apparent to those skilled in the art from the detailed description of the invention which follows.

In general, this invention comprises dissolving casein in an aqueous zinc oxide dispersion using diammonium phosphate as the solvating salt to obtain a water-resistant and viscosity-stable casein adhesive base. Also included within the scope of the invention are adhesive emulsions produced by the blending of high and low pH resin latices with the casein adhesive base. These casein-resin emulsions are excellent adhesives for bonding metallic surfaces to cellulosics and such emulsions are also viscosity-stable and water-resistant.

More specifically, the adhesive base comprises casein (either rennet casein or acid-precipitated casein), zinc oxide or a mixture of zinc oxide and aluminum oxide, and diammonium phosphate either alone or in combination with preservatives, defoamers, plasticizers, solvents, antioxidants, curing agents, accelerators, pigments, fillers, stabilizers, etc. The adhesive compositions are easily prepared by dispersing zinc oxide or a mixture of zinc oxide and aluminum oxide in water with agitation, followed by the addition of the casein. The mixture is stirred or agitated until the casein is thoroughly wetted. Diammonium phosphate is then added and usually followed by the addition of a preservative for the casein and if desired a defoamer. The mixture is heated to a temperature between about 120 and 200 degrees Fahrenheit, preferably between about 170 to 185 degrees Fahrenheit, in order to solubilize the casein.

Generally, the zinc oxide should be present in amounts of between one to 12.5 parts, preferably 3 to 7 parts, by weight to every 100 parts of casein employed. The amount of diammonium phosphate will normally range between 10 to 37.5 parts, preferably 15–22 parts, by weight based upon 100 parts of casein. At this point, it may be mentioned that the diammonium phosphates may be made in situ by adding ammonia to the zinc oxide-casein solution, followed by the addition of dilute phosphoric acid. Preferably, the zinc oxide and diammonium phosphate are utilized in such a ratio as to obtain a casein solution having a pH in the range of 5.3 to 8.8. Part of the ZnO can be replaced with hydrated aluminum oxide. For example, 3 parts of ZnO and 2 parts of $Al_2O_3$ per 100 parts of casein. Aluminum oxide alone can be used but zinc oxide is preferred inasmuch as straight aluminum oxide gives quite low viscosity casein solutions, and low viscosity blends with the resin emulsions. The amount of water utilized in the system is limited only by the viscosity desired.

Utilization of zinc oxide for water resistance of casein adhesives is known, but such solutions have an unstable viscosity. Likewise, phosphates have been used to make casein solution, but such solutions also lose their viscosity. It was, therefore, quite surprising and thoroughly unexpected to discover that the incorporation of small amounts of zinc oxide in conjunction with diammonium phosphate would give a viscosity-stable casein solution. While applicant does not intend to be bound by any particular theory, and while the mechanism is not completely clear, it is thought that the zinc forms some sort of a zinc-ammonia complex, which, in turn, reacts with the casein, rendering a viscosity-stable solution having a pH range of between about 5.0 to 9.0. The diammonium phosphate appears to be unique since other dibasic phosphates such as disodium or dipotassium phosphate, etc., do not hold the zinc and the zinc oxide is precipitated out in a short time. Also, the zinc oxide is precipitated out of blends of casein solutions and resin latices in the absence of the diammonium phosphate.

The present invention also provides for the addition of emulsions of polymers having a wide range of high molecular weight to the casein adhesive bases. Such high molecular weight resins include the natural or synthetic resins and/or natural or synthetic rubbers and the like.

To the casein adhesive base there may be added one or more of the elastomers in an emulsion form, such as natural rubber latex, Butyl rubber, Buna S, Perbunan latex, neoprene latex, Vistanex (isobutylene), styrene-butadiene latex, polyvinyl alcohol, and Thiokol (prepared from ethylene dichloride and sodium polysulfide). Other synthetic polymers such as the alkadienes-acrylonitrile copolymers (butadiene-acrylonitrile), the polymerized olefins (polyethylene, polypropylene, polybutylene, etc.), the polyacrylates which include polymers and copolymers of acrylic and methacrylic acids and their lower alkyl esters such as polymethyl methacrylate and polyethyl acrylate, the vinyl lower carboxylates such as polyvinyl acetate, polyvinyl propionate and polyvinyl butylate and also copolymers of the vinyl lower carboxylates with the lower alkyl alcohol esters of unsaturated mono- and dicarboxylic acids (copolymer of 80% polyvinyl acetate and about 20% dibutyl maleate for example) can be added. Also included are the polyvinyl halides such as the plasticized and unplasticized polyvinyl chlorides (Exon and Geon series), the copolymers of vinyl halides with vinylidene halide or vinyl carboxylates (copolymers of vinyl chloride with vinylidene chloride or vinyl acetate) the polyvinyl alkyrals such as the Butvar resins (polyvinyl butyral), the polyvinyl lower alkyl ethers such as polymethyl vinyl ether, polyethyl vinyl ether, polyvinyl n-butyl ether and polyvinyl isobutyl ether, and copolymers of alkyl acrylates and vinyl pyrrolidone such as vinyl pyrrolidone-ethyl acrylate copolymer emulsions. These resins are usually emulsified or dispersed in water and the colloidal suspension incorporated in the table casein adhesive base. In general, the amount of resin in the blends will range from 33–400 parts of resin emulsion (40–60% solid) for every 100 parts of casein base. As can be seen by the list of the above resins, the casein adhesive solutions of this invention are compatible with both the low pH resin latices and with the high pH or alkaline resin emulsions. Neoprene latex is the preferred polymeric resin for emulsion with the adhesive.

The casein adhesive bases of the instant invention can also be used as an emulsifying and stabilizing agent in making various emulsions. Hard-to-emulsify resins such as polyethylene can be emulified with the aid of this particular casein solution. Other polymeric resins of the nonelastomer type, in the emulsions form, may be utilized in the present invention. Included are the vinyl resins, melamine resins, urea formaldehyde resins, vinsol resins, rosin, and rosin esters, phenol modified rosins and the like. If at any time it is desirable to lower the pH range of the casein-resin solution, dilute phosphoric acid or monoammonium phosphate may be added.

The mixtures of the casein adhesive solution in various proportions with these resin emulsions produce most useful viscosity-stable adhesives which can be utilized for foil laminating, wood bonding such as the making of plywood, etc. The adhesive is especially valuable for the production of foil and paper combinations for the wrapping of food products. The adhesive adheres quickly and satisfactorily and yields a strong bond when dried. Furthermore, the bond does not deteriorate to any extent when the laminate is rewetted. Also, the laminated paper-foil sheets can withstand folding, and does not delaminate at elevated temperatures.

The following examples are presented to illustrate the invention. It will be understood that these example are illustrative and should not be taken in any manner as limiting the invention as defined in the appended claims.

EXAMPLE I

A solution was prepared by dispersing, with good agitation, 4 parts of zinc oxide in 440 parts of water. To this mixtures was added 82 parts of casein and the system stirred until all the casein was thoroughly wetted. Then 16 parts of diammonium phosphate was added, followed by the addition of preservatives. The preservatives consisted of 2 parts of Dowicide A (sodium orthophenylphenate), and 2 parts of Dowicide G (sodium pentachlorophenate). The mixture was heated to a temperature of about 180° F. so as to solubilize the casein, the resulting adhesive having a pH of about 7.0.

EXAMPLE II

A casein solution was prepared by stirring 4 parts of zinc oxide and 80 parts casein into 400 parts of water. 14.7 parts of a 28% ammonia solution, 3 parts of Dowicide A and 3 parts of Dowicide G were then added and the mixture heated to 175° F. to solubilize the casein. An additional 40 parts of water, along with 14 parts of an 85% phosphoric acid solution were added so as to react with the ammonia to form the diammonium phosphate in situ. To this material there may be added a suspension of a high molecular weight resin; for example, a natural rubber latex in the amount of 50 to 200 parts by weight per 100 parts of casein base.

EXAMPLE III

To 100 parts of the casein adhesive base of Example I there was added 100 parts of neoprene latex (polymerized chloroprene). The resultant system had a pH of 8.5 and a viscosity for 3,000 cps. This material was applied in the usual way to a sheet of aluminum foil and covered with a sheet of paper. The laminate was rolled and dried quickly by heat. After cooling the foil was torn from the paper by peeling. The adhesive gave a 100% paper fiber failure. It had very little tendency to foam, and machined very well and was quite easy to clean up.

EXAMPLE IV

A similar mixture utilizing 100 parts of Darex B (a copolymer emulsion of about 80% polyvinyl acetate and 20% dibutyl maleate and having about 55% solids) and 100 parts of the casein base produced as in Example I was blended together. The adhesive blend was an excellent foil adhesive producing an excellent paper fiber failure.

EXAMPLE V

An excellent aluminum foil-paper laminate was produced by using 800 parts of natural rubber latex, 800 parts of the casein adhesive base, and 70 parts of a 20% monoammonium phosphate solution. The monoammonium phosphate was added to bring the final pH of the system down from 9.0 to 6.8. The viscosity of the laminating adhesive was 1200 cps.

EXAMPLE VI

An adhesive similar to that of Example V was prepared by using 1,000 parts of GRS latex (a copolymer of 1,3-butadiene and styrene), 800 parts of the casein base and 30 parts of a 20% monoammonium phosphate solution. This adhesive had a pH of 6.8, a viscosity of 25 cps. and had excellent foil adhesive properties and water resistance.

EXAMPLE VII

Another foil laminating adhesive was produced by using 100 parts of Rhoplex B–10 (an acrylic emulsion containing about 90% ethyl acrylate and some methyl methacrylate and having about 45% solids) and 80 parts of the casein base produced in accordance with Example II. The material shows an excellent dry and wet strength when used as a cement between paper and aluminum foil.

EXAMPLE VIII

A good word-working adhesive was produced by blending 100 parts of Elvacet 81–900 (a 55% solids polyvinyl acetate emulsion), 10 parts of dibutyl phthalate and 100 parts of the casein base produced in accordance with Example II. This formula was used in bonding plywood and showed high initial and aged strengths, as well as very good results with paper and foil.

The above adhesive combinations can be used to laminate metallic surfaces to cellulosics in general and specifically aluminum, tin and copper foil to paper for use in food packaging, beer bottle labels, in laminated wrappings for cigaretts and gum, etc. They can also be used to bond wood, glass, leather, plastics, etc. In addition, the resulting compositions possess excellent stability, have little tendency to foam, have good machining properties and are relatively easy to clean up.

Any of the conventional modifiers such as defoamers, plasticizers, organic solvents, antioxidants, curing agents, accelerators, pigments, dyes, fillers or stabilizers may be added to the casein adhesive base or the foil laminating compositions without affecting the nature of the product or the process of making it.

I claim:

1. A cellulose-metallic laminate comprising, in combination, a metallic layer and a cellulosic layer with an interposed adhesive therebetween which is strongly adherent to both the metallic and the cellulosic layers comprising, a casein solution, a member selected from the group consisting of zinc oxide, aluminum oxide and mixtures thereof, diammonium phosphate and an aqueous emulsion of a material selected from the group consisting of natural and synthetic elastomers.

2. The laminate of claim 1 wherein the metallic layer is aluminum foil and the cellulosic layer is paper.

3. The laminate of claim 1 wherein the metallic layer is selected from the group consisting of aluminum foil, copper foil and tin foil.

4. The laminate of claim 1 wherein the elastomer is a neoprene latex.

5. The laminate of claim 1 wherein the elastomer is a member selected from the group consisting of natural rubber, neoprene, styrene-alkadiene copolymers, alkadiene-acrylonitrile copolymers, polyvinylalcohol, polyvinylhalides, polyvinylidene halides, polyvinyl ethers, polyvinyl alkyrals, polyvinyl pyrrolidones, polyacrylates, polymerized olefins, ethylene polysulfide polymers, polyvinyl carboxylates and copolymers of polyvinyl carboxylates and alkyl esters of unsaturated acids.

6. The laminate of claim 1 wherein the elastomer is a copolymer emulsion of polyvinyl acetate and dibutyl maleate.

7. The laminate of claim 1 wherein the cellulosic layer is paper, the elastomer is a neoprene latex and the metallic layer is selected from the group consisting of aluminum foil, copper foil and tin foil.

8. The laminate of claim 1 wherein the casein solution contains about 1 to about 12.5 parts by weight of a member selected from the group consisting of zinc oxide, aluminum oxide, and mixtures thereof, about 10 to about 37.5 parts by weight of diammonium phosphate per 100 parts of said casein, and including from about 33 to about 400 parts by weight per 100 parts casein of an aqueous emulsion of a material selected from the group consisting of natural and synthetic elastomers.

9. The laminate of claim 8 wherein the elastomer is a neoprene latex and the cellulosic layer is paper.

10. The laminate of claim 8 wherein metallic layer is selected from the group consisting of aluminum foil, copper foil and tin foil, the elastomer is selected from the group consisting of natural rubber latex and neoprene latex and the cellulosic layer is selected from the group consisting of paper, wood and cloth.

References Cited

UNITED STATES PATENTS

| | | | |
|---|---|---|---|
| 2,346,812 | 4/1944 | Bradner | 117—156 |
| 2,482,917 | 9/1949 | Kaplan | 106—146 |
| 2,933,469 | 4/1960 | Depew | 260—8 |
| 3,053,676 | 9/1962 | Higbee | 106—148 |
| 3,166,523 | 1/1965 | Weinheimer | 260—8 |

HAROLD ANSHER, Primary Examiner

R. A. KILLWORTH, Assistant Examiner

U.S. Cl. X.R.

156—328; 161—217, 229